(12) United States Patent
Hoang et al.

(10) Patent No.: US 6,634,601 B2
(45) Date of Patent: Oct. 21, 2003

(54) ATTITUDE SENSOR FOR SPACECRAFT (75) Inventors: Thanh D. Hoang, Encino, CA (US);
Guy D. Renard, Torrance, CA (US);
Jon K. Spain, Rancho Palos Verdes, CA (US); Steven L. Branscombe, Westminster, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 10/044,145

(22) Filed: Jan. 11, 2002

(65) Prior Publication Data
US 2003/0132349 A1 Jul. 17, 2003

(51) Int. Cl.[7] .................................................. B64G 1/66
(52) U.S. Cl. ................... 244/158 R; 244/171
(58) Field of Search ............................ 244/158 R, 164, 244/171

(56) References Cited

U.S. PATENT DOCUMENTS

| | | | | |
|---|---|---|---|---|
| 5,337,981 A | * | 8/1994 | Bender .................... 244/164 |
| 6,089,510 A | * | 7/2000 | Villani et al. ............ 244/166 |
| 6,158,694 A | * | 12/2000 | Gowrinathan .............. 244/171 |
| 6,283,415 B1 | * | 9/2001 | Rosen ..................... 244/164 |
| 6,342,865 B1 | * | 1/2002 | Chandler et al. .......... 343/765 |
| 6,393,255 B1 | * | 5/2002 | Lane ...................... 342/354 |
| 2001/0045494 A1 | * | 11/2001 | Higgins ................ 244/158 R |

* cited by examiner

Primary Examiner—Michael J. Carone
Assistant Examiner—Gabriel S Sukman
(74) Attorney, Agent, or Firm—Tarolli, Sundheim, Covell & Tummino L.L.P.

(57) ABSTRACT

A spacecraft is provided that includes a communications payload having an antenna support structure and an antenna boom coupled to the antenna support structure. An attitude sensor may be mounted to the antenna boom. The attitude sensor (such as an Earth sensor, a star tracker and/or a sun sensor) may be mounted at a root of the antenna boom.

34 Claims, 8 Drawing Sheets

ATTITUDE SENSOR FOR SPACECRAFT

BACKGROUND OF THE INVENTION

1. Field of the Invention

The present invention relates to attitude sensors for satellites.

2. Discussion of Related Art

The location and orientation of a spacecraft is of critical importance. The location of the spacecraft, for example, may determine its ability to achieve scientific research goals and to transmit/receive important information to Earth, or other spacecraft. Furthermore, the location of a spacecraft may be required to determine the spacecraft trajectory and therefore its future location as well as to plan changes in the trajectory to send the spacecraft to a desired location.

Sensors are provided on satellites for indicating orientation of the satellite. Sensors may be mounted to satellites, space probes and the like, for sensing the Earth, stars and/or sun, and producing signals indicating orientation of the satellite with respect to the Earth (around which the satellite is orbiting), the stars and/or the sun. The sensors are provided for attitude control and guidance. For example, an Earth sensor may be a critical component of a communication or remote sensing satellite's attitude control subsystem. It may be desirable to maintain a communications or remote sensing satellite in a geosynchronous orbit about the Earth so as to enable a communication beam or sensor field of view from the satellite to accurately cover a desired area, such as a particular country, on the surface of the Earth. Any deviations from this attitude may alter the coverage of the beam or view. As beam size decreases, there is an increasing need for greater accuracy of the satellite and more specifically the pointing direction of antennas.

BRIEF SUMMARY OF THE INVENTION

Embodiments of the present invention may provide a spacecraft that includes a communications payload having an antenna support structure and an antenna boom coupled to the antenna support structure. An attitude sensor may be mounted to a root of the antenna boom. The root may be located at an area where the antenna boom couples to the antenna support system. The attitude sensor may include an Earth sensor and/or a star tracker.

In at least one embodiment, the communications payload may relate to Internet services. A spacecraft bus may support services of the communications payload.

Embodiments of the present invention may also provide a satellite for broadband communications. The satellite may include a communications payload to receive and transmit broadband communications. The communications payload may include an antenna boom. A sensor may be coupled to the payload at a root of the antenna boom.

Other embodiments, objects, advantages and salient features of the invention will become apparent from the detailed description taken in conjunction with the annexed drawings, which disclose arrangements and preferred embodiments of the invention.

BRIEF DESCRIPTION OF THE DRAWINGS

The foregoing and a better understanding of the present invention will become apparent from the following detailed description of arrangements, example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION OF THE INVENTION

In the following detailed description, like reference numerals and characters may be used to designate identical, corresponding, or similar components in differing drawing figures. Furthermore, in the detailed description to follow, examples may be given, although the present invention is not limited thereto.

Figure 1:
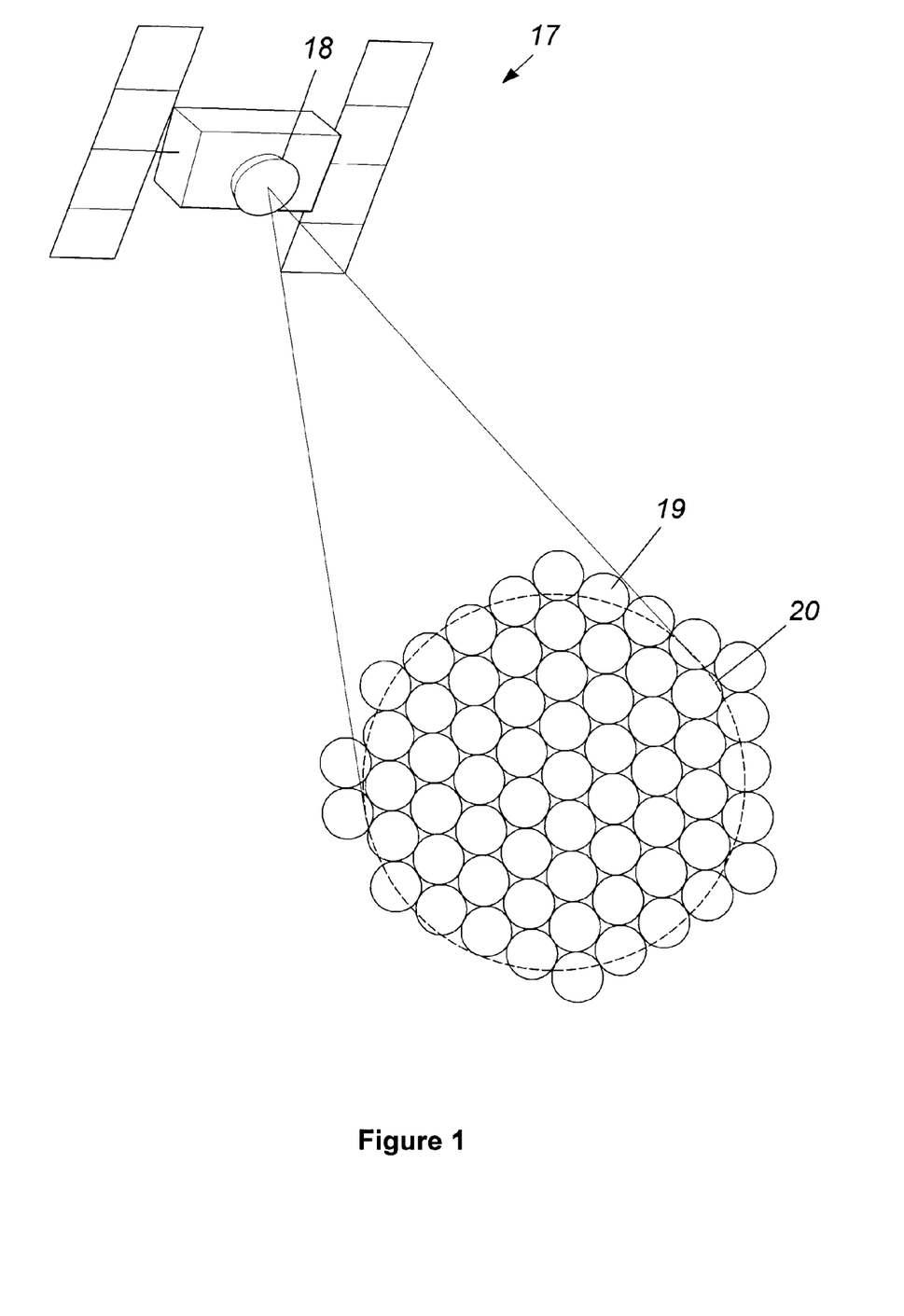
FIG. 1 is a drawing showing a satellite with an antenna system for spot beam earth coverage.

FIG. 1 shows a spacecraft 17 (such as a satellite) having an antenna system 18 for providing antenna beams 19 on Earth 20. The antenna system 18 may be used for communications between the spacecraft 17 and the Earth 20 when the spacecraft 17 is preferably located in a geosynchronous or near geosynchronous orbit. The antenna system 18 may provide symmetrically shaped antenna beams 19 on the Earth 20 from the spacecraft 17.

Figure 2:
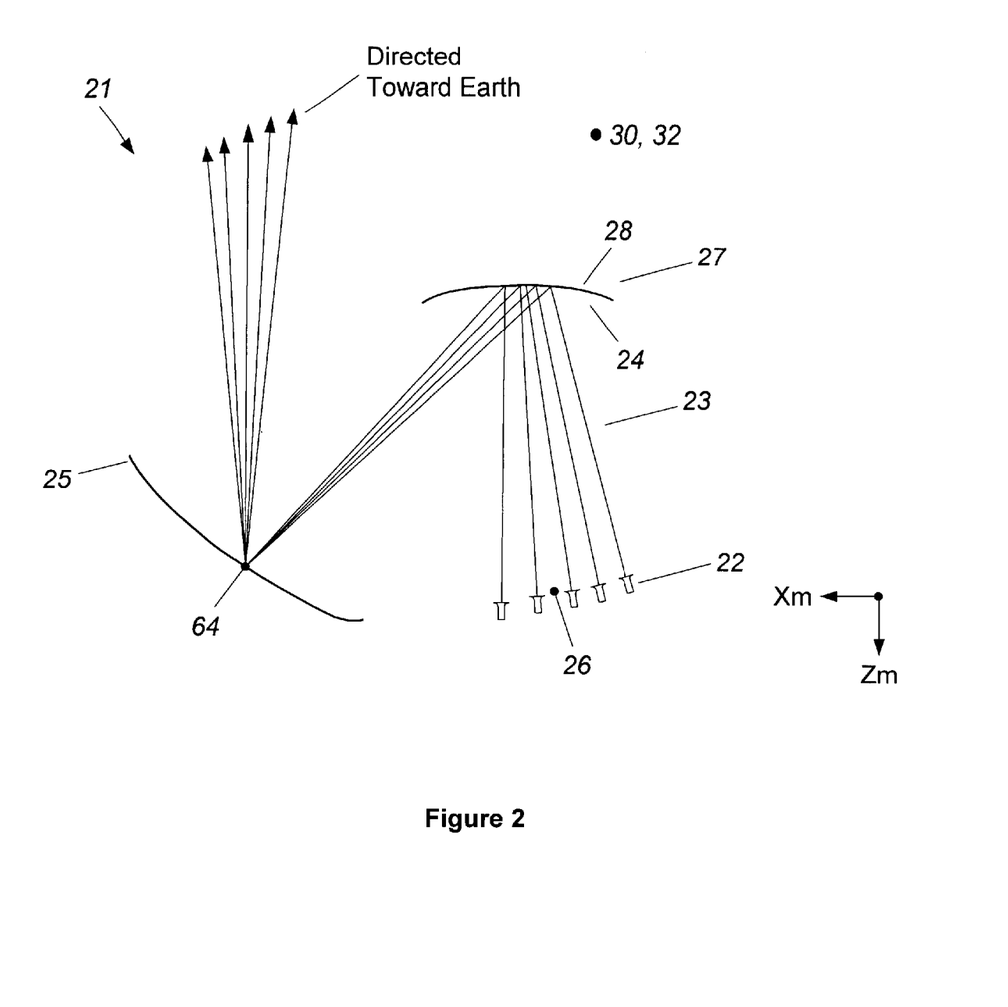
FIG. 2 is a plan view of an offset Cassegrain antenna system.

FIG. 2 shows an antenna system 21 that includes a main reflector 25, a subreflector 27 and a feed array 22 configured in an offset Cassegrain antenna configuration so that the illumination beams (depicted by the lines marked 23) provided by the feed array 22 are reflected towards Earth from the main reflector 25 in a manner that is substantially or totally free of blockage by the subreflector 27 or the feed array 22. Each subreflector and main reflector combination and associated feed array together may define a separate offset cassegrain antenna configuration. A more detailed discussion of offset cassegrain antenna configurations can be found in "Development of dual reflector multibeam spacecraft antenna system" by Jorgenson et al. IEEE Transactions of Antennas and Propagation, Vol. AP-32, pp. 30–35, 1984, the subject matter of which is incorporated herein by reference. The location of the feed array 22 offset from the subreflector 27 and the main reflector 25 may define the antenna system 21 as being "offset". The subreflector 27 may be a portion of a hyperbola that has a concave side 24 with an associated focal point 26 and a convex side 28 with an associated focal point 30. The main reflector 25 may be a portion of a parabola having a main reflector focal point 32.

The position, orientation and pointing direction of each feed in the feed array 22 relative to the subreflector 27 and the main reflector 25 may determine the location of each antenna beam 19 (FIG. 1) on the Earth 20. In some satellite systems, an illumination beam may cover a large geographical area, such as all of North America for one illumination beam and/or all of Brazil for another illumination beam. With spot beam transmission, the accuracy of the beam may be much more precise than the precision needed for wide geographic coverage.

Figure 3:
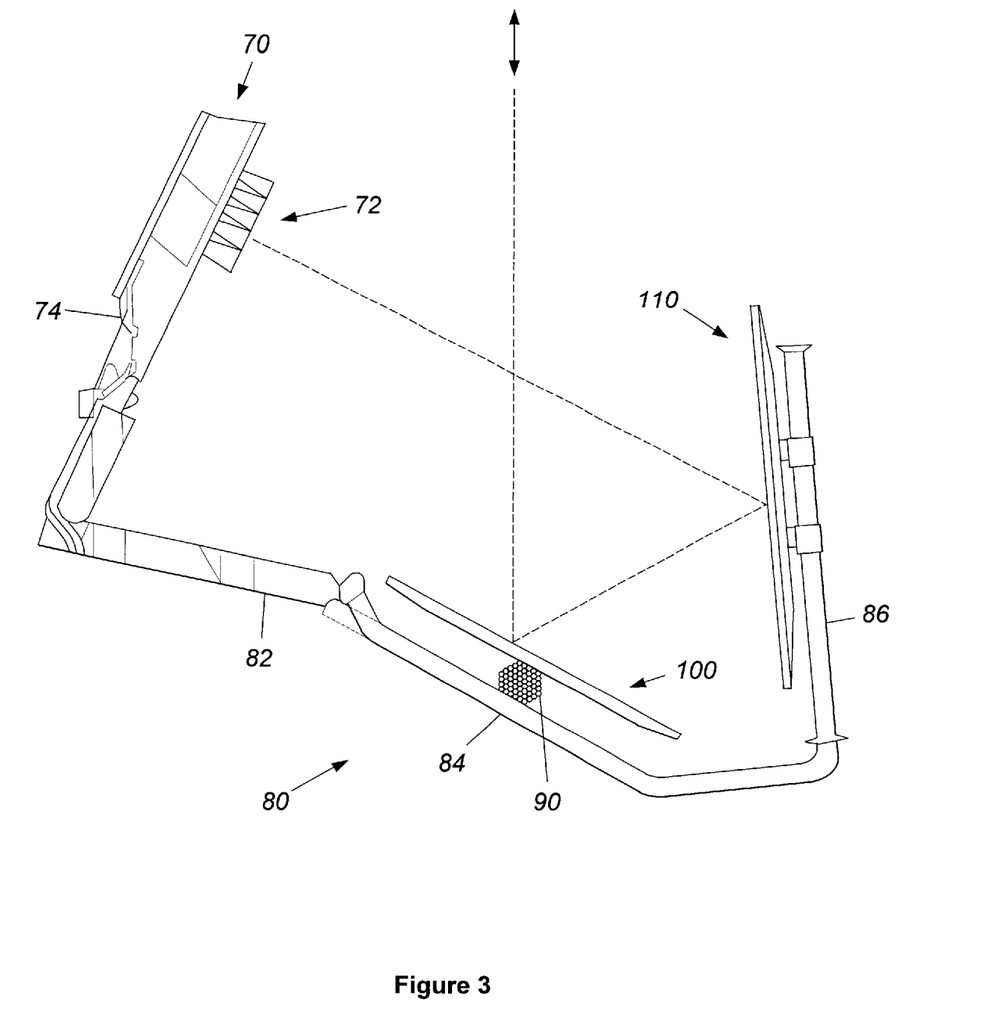
FIG. 3. is a view of an offset Cassegrain antenna system.

FIG. 3 is a view of an offset cassegrain antenna system according to one arrangement. Other arrangements are also possible. FIG. 3 shows a feed panel 70 that contains a plurality of antenna feeds 72 to direct antenna beams as described above. The feed panel 70 may be supported by an arm 74 or a similar type of arm mechanism. FIG. 3 also shows an antenna boom assembly 80 that includes a first antenna boom section 82, a second antenna boom section 84 and a third antenna boom section 86. Each of the antenna boom sections 82, 84 and 86 may be formed of graphite (or similar type of material) or a graphite composition as is well known in the art. The antenna boom assembly 80 may contain appropriate mechanisms to allow the antenna boom section to fold up in a compact manner (such as during launch) and to enable alignment and reconfiguration when in orbit. U.S. Pat. No. 6,124,835, the subject matter of which is incorporated herein by reference, discloses mechanisms to deploy a dual reflector system.

A main reflector 100 may be mounted above the second antenna boom section 84. A subreflector 110 may be mounted above the third antenna boom section 86. As discussed above, antenna beams may radiate from the feed 72 towards the subreflector 110, redirected to the main reflector 100 and then directed to Earth. However, it may be desirable to reposition the main reflector 100 once in orbit or every so often to correct misalignment problems. Accordingly, the second antenna boom section 84 may include a positioning mechanism 90 mounted to the second antenna boom section 84. The main reflector 100 may be mounted on a top of the positioning mechanism 90 such that the positioning mechanism 90 may reposition an angle of the main reflector 100 relative to the second antenna boom section 84 based on control signals.

Figure 4:
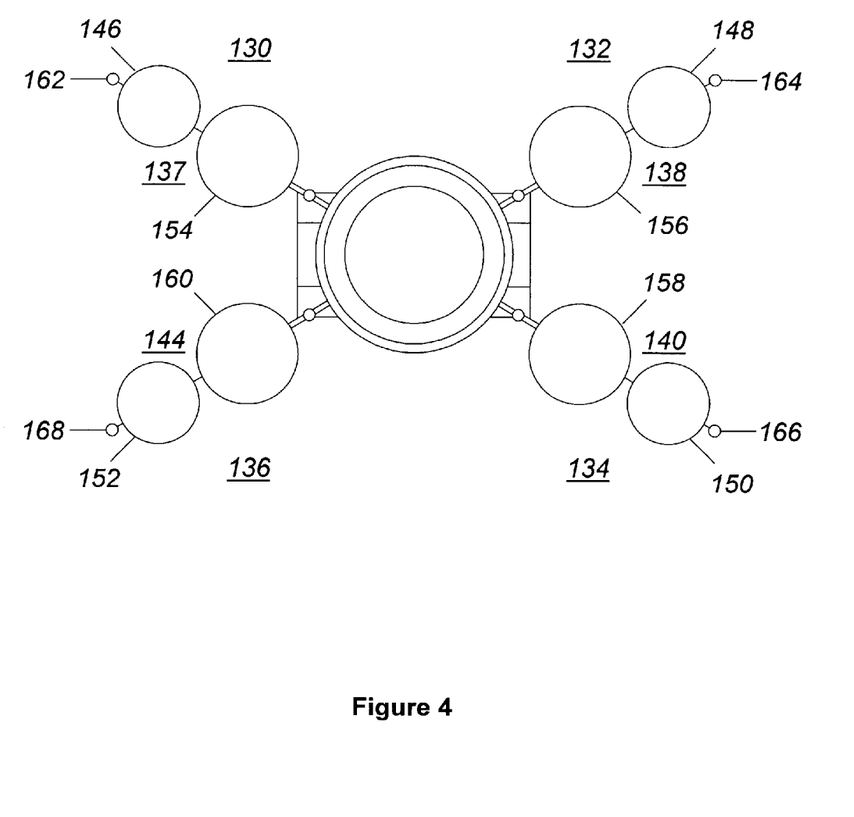
FIG. 4 is view showing a satellite having a plurality of offset Cassegrain antenna systems.

FIG. 4 shows a plurality of offset cassegrain antennas 130, 132, 134 and 136 mounted on a satellite. Each antenna 130, 132, 134 and 136 has a subreflector and main reflector combination 137, 138, 140 and 144, respectively, and a separate feed array 162, 164, 166 and 168, respectively, associated with each subreflector and main reflector combination. Each subreflector and main reflector combination and associated feed array together may define a separate offset cassegrain antenna configuration. A separate feed array 162–168 may be associated with each subrefledtor and main reflector combination 137–144. In one arrangement, each feed in a feed array 162–168 may generate one illumination beam. In another arrangement, a plurality of the feeds may generate one illumination beam.

In narrow beam communications systems, it may be necessary to tightly control the beam pointing direction of a transmitting antenna so that it is accurately directed towards the proper location. For example, in satellite communication systems that operate in the gigahertz frequency range and employ high gain beams, it may be necessary that the satellite transmit antenna be accurately pointed at the ground reference location to ensure that the highest power portion of the beam is received at the desired location. Because satellite position and attitude drift relative to the ground station, antenna direction control may be necessary to adjust the pointing direction of the satellite antenna or the pointing direction of the ground station antenna to maintain an accurate pointing direction.

To perform this directional control for communications systems, it may be necessary to change the pointing direction of the entire antenna system, and/or adjust the attitude direction of the satellite relative to Earth.

In order to properly orient a satellite, a reference point may be needed so that the payload (including the antennas) of the satellite may be properly oriented. That is, if the antenna is not properly oriented in the right position, then the illumination beam on Earth may not be received at the proper location. This becomes increasingly important in spot beam transmission since spot beam transmission may require more precise reception locations on Earth. That is, the geographic area of illumination may be a few hundred square miles much less than previously provided for wide geographic areas. That is, in wide beam transmissions covering large geographic areas, one beam may be provided from a satellite for all of North America, and one beam may be provided from a satellite for all of South America. Thus, the orientations of the large beams may not need to be extremely accurate. Spot beams, especially involving broadband communications from communication payloads, may require much more precise pointing of the beams from the satellite.

Arrangements may provide an Earth sensor on a spacecraft bus of the satellite. The Earth sensor on the spacecraft bus may provide signals representative of the orientation of the satellite with respect to the Earth. Based on the sensor readings, the bus, payload and antenna may be readjusted so that proper orientation of the antenna may be provided. Because antennas are part of the payload and the sensor is mounted to the spacecraft bus, some error may occur between the location that the sensor senses and the actually orientation of the antenna and the antenna beam. Distortions may occur between the spacecraft bus structure and the payload structure. It is therefore desirable to provide a sensor as close to the antenna as possible. One reason this has not been previously done is that past attitude sensors where mounted by the manufacturer/assembler of the satellite bus, which was coupled to the payload. Thus, the mounting of the sensor was separate from the antenna system. It is desirable to have more precise control in view of spot beams for a communication satellite so as to eliminate errors in spot beam transmission. Previous distortion errors were tolerated since the beams had wide geographic coverage areas. Embodiments of the present invention may locate the sensor on or near the structure (such as the antenna boom) that is being oriented so as to eliminate intermediate errors between an Earth sensor (mounted on the spacecraft bus) and the antennas. Embodiments of the present invention may also provide a star tracker on a root of the boom of an antenna (or antenna boom). This may help provide better precision than locating an Earth sensor on the spacecraft bus of the satellite. In a preferred embodiment, an attitude sensor (such as a star tracker or an Earth sensor) may be mounted at the root of a boom of an antenna.

Arrangements and embodiments will now be described with respect to FIGS. 5–8.

Figure 5:
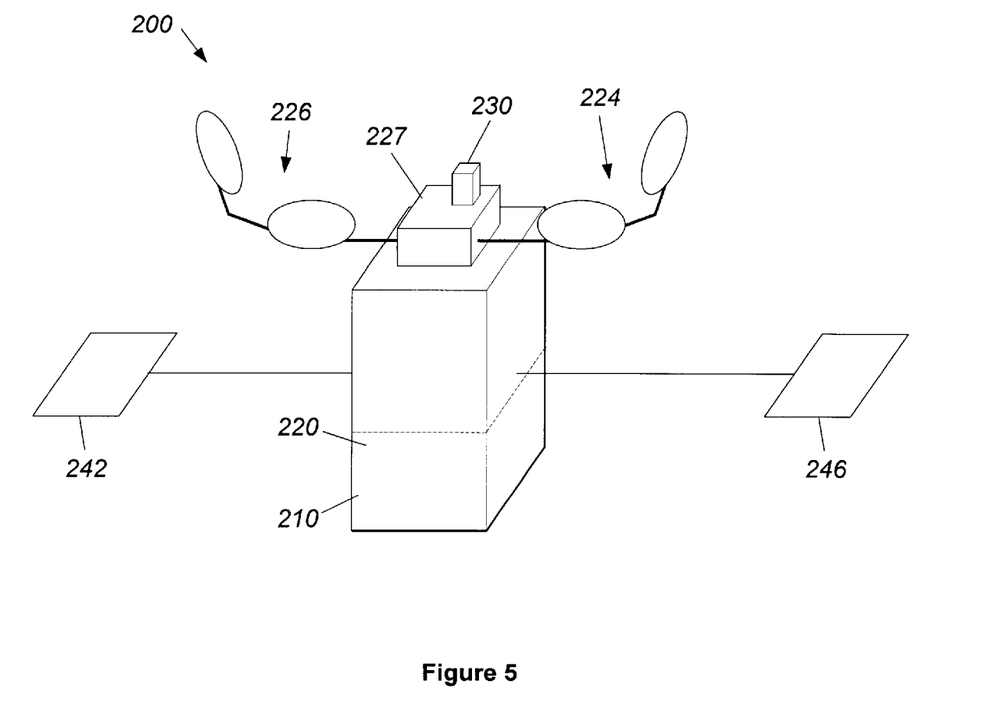
FIG. 5 is a view of a spacecraft having an Earth sensor.

FIG. 5 shows a satellite 200 according to one arrangement. The satellite 200 includes a spacecraft bus 210 and a communications payload 220. The satellite 200 also includes an antenna support structure 227 that supports a first antenna boom 224 and a second antenna boom 226.

Each of the antenna booms 224 and 226 may be a dual reflector antenna system such as that shown in FIG. 3. FIG. 5 additionally shows a first solar array wing 242 and a second solar array wing 246. In this arrangement, an Earth sensor 230 is mounted on the antenna support structure 227.

Figure 6:
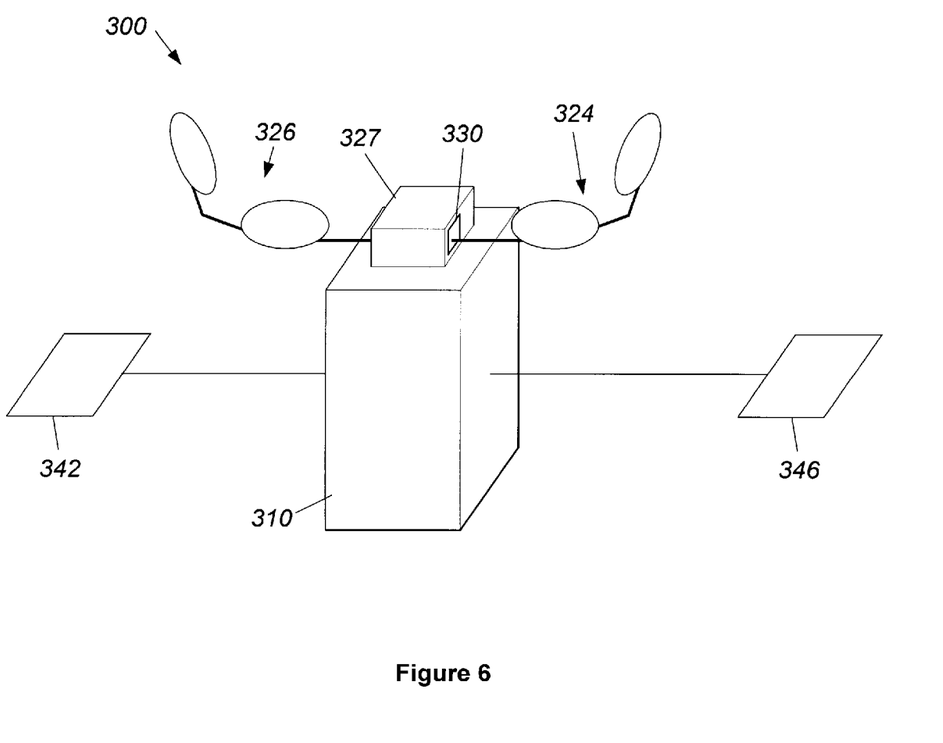
FIG. 6 is a view of a spacecraft having an attitude sensor mounted according to an example embodiment of the present invention.

FIG. 6 shows a satellite 300 according to an example embodiment of the present invention. Other embodiments and configurations are also within the scope of the present invention. More specifically, FIG. 6 shows a unified spacecraft communications payload/bus 310 that includes an antenna support structure 327. A first antenna boom 324 and a second antenna boom 326 may be coupled to the antenna support structure 327. Each of the first antenna boom 324 and the second antenna boom 326 may correspond to a dual reflector system such as that shown in FIG. 3. FIG. 6 additionally shows a first solar array 342 and a second solar array 346. As shown, FIG. 6 includes an attitude sensor (such as a star tracker, an Earth sensor or a sun sensor) mounted at an area at which the antenna boom couples to the antenna support structure 327. That is, the attitude sensor 330 may be coupled at a root of the antenna boom structure 324. Although not shown, an attitude sensor may also be provided at a root of the antenna boom structure 326. This dislocation of the attitude sensor may improve the payload antenna pointing control accuracy by minimizing the relative structural and thermal distortions between the antenna and the sensor in disadvantageous arrangements.

Figure 7:
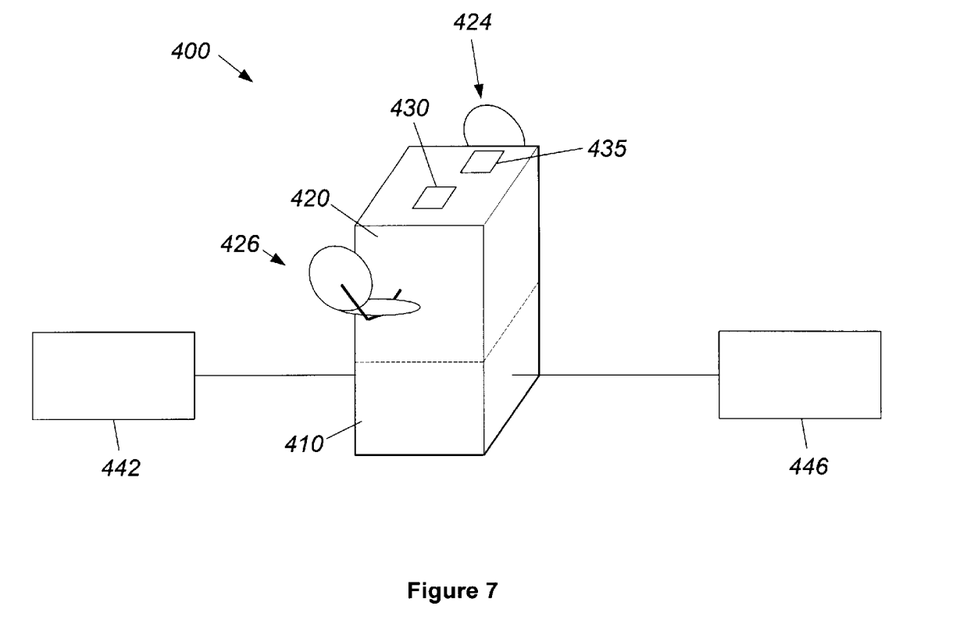
FIG. 7 is a view of a spacecraft having an Earth sensor.

FIG. 7 shows a satellite 400 according to one arrangement. In this arrangement, the satellite 400 may include a spacecraft bus 410 and a communications payload 420. A first antenna boom structure 424 and a second antenna boom structure 426 may be mounted on the satellite 400. Each of the antenna boom structures 424 and 426 may be a dual reflector antenna system such as shown in FIG. 3. The satellite 400 may also include a first solar array wing 442 and a second solar array wing 446. In this arrangement, an Earth sensor 430 and a star tracker 435 may be mounted on a top portion of the satellite 400.

Figure 8:
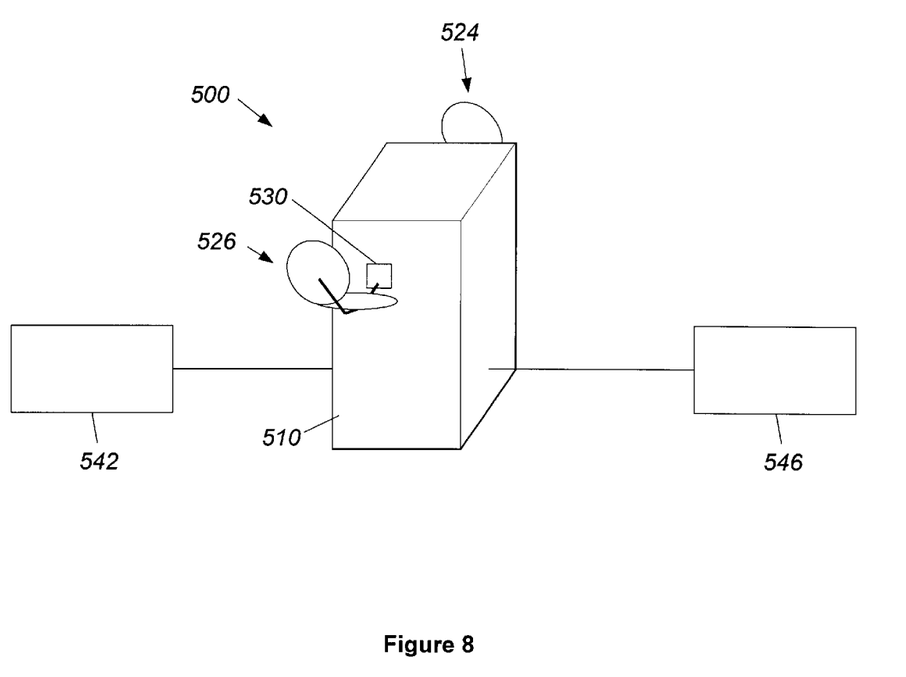
FIG. 8 is a view of a spacecraft having an attitude sensor mounted according to an example embodiment of the present invention.

FIG. 8 shows a satellite 500 according to an example embodiment of the present invention. Other embodiments and configurations are also within the scope of the present invention. More specifically, the satellite 500 includes a unified spacecraft communications payload/bus 510. The unified payload/bus 510 may include a first antenna boom structure 524 and a second antenna boom structure 526. Each of the antenna boom structures 524 and 526 may be a dual reflector antenna structure such as shown in FIG. 3. The satellite 500 may also includes a first solar array wing 542 and a second solar array wing 546. As shown, an attitude sensor 530 is mounted in an area at which the antenna boom structure 526 couples to the unified communications payload/bus 510. That is, the attitude sensor (such as a star tracker, an Earth sensor or a sun sensor) may be mounted at a root of the antenna boom structure 526. Although not shown, an attitude sensor may also be mounted at a root of the antenna boom structure 524.

Embodiments of the present invention are also applicable to having an attitude sensor on the antenna aperture (i.e., directly onto the antenna dish).

A star tracker may have a different field of view than the Earth or sun sensor. That is, in some payload designs, the field of view to the Earth or sun may be limited so the star tracker may be the preferred option.

Accordingly, embodiments of the present invention have been described with respect to a spacecraft that includes a communications payload including an antenna support structure and an antenna boom coupled to the antenna support structure. An attitude sensor may be mounted to a root of the antenna boom. Embodiments of the present invention may provide advantages over disadvantageous arrangements in which distortion in the structural path between the payload and the attitude sensor is a significant contributor to the communications payload pointing error. Embodiments of the present invention may further provide attitude sensors to orient geosynchronous communications payloads. Disadvantageous geosynchronous communications satellites may mount attitude sensors on the nadir platform and/or on the satellite east/west side of the nadir and far away from the antenna. Embodiments of the present invention may improve upon this location. Embodiments of the present invention may provide improvements by mounting an attitude sensor closer to the structure (i.e., the antenna boom) that is to be pointed/oriented. By utilizing embodiments of the present invention, structural and thermal distortion effects may be minimized by collocating the attitude sensor with the communication payload antenna.

Any reference in the above description to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the knowledge of one skilled in the art to effect such feature, structure, or characteristic in connection with other ones of the embodiments.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A spacecraft comprising:
   a communications payload including an antenna support structure and an antenna boom coupled to said antenna support structure; and
   an attitude sensor mounted at a same location as said antenna boom.

2. The spacecraft of claim 1, wherein said attitude sensor is mounted to a root of said antenna boom.

3. The spacecraft of claim 2, wherein said root is located at an area that said antenna boom couples to said antenna support system.

4. The spacecraft of claim 1 wherein said attitude sensor comprises an Earth sensor.

5. The spacecraft of claim 1, wherein said attitude sensor comprises a star tracker.

6. The spacecraft of claim 1, wherein said attitude sensor comprises a sun sensor.

7. The spacecraft of claim 1, wherein said communications payload relates to Internet services.

8. The spacecraft of claim 1, further comprising a spacecraft bus to support services of said communications payload.

9. The spacecraft of claim 1, wherein said payload further includes a feed array to perform spot beam transmission.

10. The spacecraft of claim 9, wherein said spot beam transmission relates to broadband communications.

11. A spacecraft comprising:
   a communication payload including an antenna boom; and
   an attitude sensor mounted at a same location as said antenna boom, wherein said attitude sensor is mounted at a same location as a root of said antenna boom.

12. The spacecraft of claim 11, wherein said payload comprises a communications payload.

13. The spacecraft of claim 11, wherein said sensor comprises an Earth sensor.

14. The spacecraft of claim 11, wherein said sensor comprises a star tracker.

15. The spacecraft of claim 11, wherein said sensor comprises a sun sensor.

16. The spacecraft of claim 11, wherein said sensor is mounted to a root of said antenna boom.

17. The spacecraft of claim 16, wherein said payload includes an antenna support structure and said root is located at an area that said antenna boom is mounted to said antenna support system.

18. The spacecraft of claim 11, wherein said payload relates to Internet services.

19. The spacecraft of claim 11, further comprising a spacecraft bus to support services of said payload.

20. The spacecraft of claim 11, wherein said payload further includes an antenna boom support structure to support said antenna boom.

21. The spacecraft of claim 11, wherein said payload further includes a feed array to perform spot beam transmission.

22. The spacecraft of claim 21, wherein said spot beam transmission relates to broadband communications.

23. A satellite for broadband communications, said satellite comprising;
   a communications payload to receive and transmit broadband communications, said communications payload including an antenna boom; and
   an attitude sensor mounted at a same location as said antenna boom.

24. The satellite of claim 23, wherein said sensor is mounted to said antenna boom.

25. The spacecraft of claim 23, wherein said sensor comprises an Earth sensor.

26. The spacecraft of claim 23, wherein said sensor comprises a star tracker.

27. The spacecraft of claim 23, wherein said sensor comprises a sun sensor.

28. The spacecraft of claim 23, wherein said sensor is mounted to a root of said antenna boom.

29. The spacecraft of claim 28, wherein said root is located at an area that said antenna boom is mounted to an antenna support structure.

30. The spacecraft of claim 23, wherein said communications payload relates to Internet services.

31. The spacecraft of claim 23, further comprising a spacecraft bus to support services of said communications payload.

32. The spacecraft of claim 23, wherein said payload further includes an antenna boom support structure to support said antenna boom.

33. The spacecraft of claim 32, wherein said payload further includes a feed array to perform spot beam transmission.

34. The spacecraft of claim 33, wherein said spot beam transmission relates to broadband communications.

* * * * *